US011389855B2

(12) United States Patent
Yamamoto et al.

(10) Patent No.: US 11,389,855 B2
(45) Date of Patent: Jul. 19, 2022

(54) METHOD FOR MANUFACTURING SWAGED STRUCTURE AND SWAGED STRUCTURE

(71) Applicants: AISIN CORPORATION, Kariya (JP); HISADA CO., LTD., Anjo (JP)

(72) Inventors: Koji Yamamoto, Fujisawa (JP); Yohei Amemiya, Fujisawa (JP); Takashi Harada, Fujisawa (JP); Masashi Saeki, Anjo (JP); Masahiro Hashiguchi, Anjo (JP); Yasuchika Sasaki, Anjo (JP)

(73) Assignees: AISIN CORPORATION, Kariya (JP); HISADA CO., LTD., Anjo (JP)

( * ) Notice: Subject to any disclaimer, the term of this patent is extended or adjusted under 35 U.S.C. 154(b) by 632 days.

(21) Appl. No.: 16/190,572

(22) Filed: Nov. 14, 2018

(65) Prior Publication Data
US 2019/0143390 A1     May 16, 2019

(30) Foreign Application Priority Data

Nov. 15, 2017  (JP) ............................. JP2017-220271

(51) Int. Cl.
*B21D 39/02*  (2006.01)
*B21D 53/88*  (2006.01)
*B60J 5/04*  (2006.01)

(52) U.S. Cl.
CPC ........... *B21D 39/021* (2013.01); *B21D 53/88* (2013.01); *B60J 5/0469* (2013.01); *B21D 39/026* (2013.01);
(Continued)

(58) Field of Classification Search
CPC .... B21D 39/021; B21D 53/88; B21D 39/026; B21D 39/02; B21D 31/021; B21D 31/023;
(Continued)

(56) References Cited

U.S. PATENT DOCUMENTS 3,861,339 A * 1/1975 Aida .................... B21D 39/026
29/505
3,909,918 A * 10/1975 Takizawa ............. B21D 39/021
29/509
(Continued)

FOREIGN PATENT DOCUMENTS

JP    2006-341305 A    12/2006
JP    2015-013496 A     1/2015
(Continued)

OTHER PUBLICATIONS

Office Action (Notice of Reasons for Refusal) dated Sep. 1, 2021, by the Japanese Patent Office in corresponding Japanese Patent Application No. 2017-220271 and an English Translation of the Office Action. (8 pages).

*Primary Examiner* — Sarang Afzali
*Assistant Examiner* — Darrell C Ford
(74) *Attorney, Agent, or Firm* — Buchanan Ingersoll & Rooney PC

(57) ABSTRACT

The end portion of a first member includes a plate part and a groove. The end portion of a second member includes an edge and two side surfaces. The groove extends around the edge of the second member and the two side surfaces. The groove includes a side surface including an engaging portion. One of the side surfaces of the end portion of the second member includes an engaged portion. A method for manufacturing a swaged structure includes preparing the first member including the plate part and the groove having a wide opening. The method further includes inserting the end portion of the second member into the groove after preparing the first member. The method further includes pressing the plate part in a direction narrowing the opening of the groove to bring the engaging portion into contact with the engaged portion after inserting the second member.

4 Claims, 4 Drawing Sheets

(52) U.S. Cl.
CPC ...... *Y10T 29/4984* (2015.01); *Y10T 29/49826* (2015.01); *Y10T 29/49845* (2015.01); *Y10T 29/49861* (2015.01); *Y10T 29/49906* (2015.01); *Y10T 29/49908* (2015.01); *Y10T 29/49925* (2015.01)

(58) Field of Classification Search
CPC ..... B21D 31/026; B60J 5/0469; B60J 5/0402; Y10T 29/4984; Y10T 29/4982; Y10T 29/49861; Y10T 29/49925; Y10T 29/49906; Y10T 29/49908; Y10T 29/49845; F16B 11/00
USPC ......... 29/243.58, 428, 445, 469.5, 505, 515, 29/434, 437
See application file for complete search history.

(56) References Cited

U.S. PATENT DOCUMENTS

| | | | | |
|---|---|---|---|---|
| 3,909,919 | A * | 10/1975 | Miyabayashi | B21D 39/021 29/521 |
| 6,029,334 | A * | 2/2000 | Hartley | B21D 39/021 29/464 |
| 7,007,368 | B2 * | 3/2006 | Sovoda | B21D 39/021 29/505 |
| 7,051,566 | B2 * | 5/2006 | Baulier | B21D 39/021 29/243.58 |
| 8,087,720 | B2 * | 1/2012 | Wang | B62D 25/105 296/193.11 |
| 2005/0102817 | A1 * | 5/2005 | Sovoda | B21D 39/021 29/509 |
| 2006/0000255 | A1 * | 1/2006 | Baulier | B21D 39/021 72/306 |
| 2016/0200182 | A1 | 7/2016 | Ogawa et al. | |
| 2021/0146759 | A1 * | 5/2021 | Gardynik | B60J 5/0413 |
| 2021/0285475 | A1 * | 9/2021 | Koehler | B60R 13/0243 |
| 2021/0293024 | A1 * | 9/2021 | Rider | E04D 15/04 |
| 2021/0316352 | A1 * | 10/2021 | Shinmiya | B21D 19/00 |
| 2021/0347239 | A1 * | 11/2021 | Nolte | B60J 10/76 |

FOREIGN PATENT DOCUMENTS

| | | |
|---|---|---|
| JP | 2015-052371 A | 3/2015 |
| JP | 6050672 B2 | 12/2016 |

* cited by examiner

METHOD FOR MANUFACTURING SWAGED STRUCTURE AND SWAGED STRUCTURE

BACKGROUND ART

The present invention relates to a method for manufacturing a swaged structure and a swaged structure.

A typical vehicle door frame includes an outer member having an ornamental surface at a vehicle outer side and an inner member coupled to the outer member to form the framework of a window frame. Swaging is a type of process for joining the outer member and the inner member.

For example, Japanese Laid-Open Patent Publication No. 2015-13496 describes a hemming-coupled structure in which the inner member has an end portion including a projection and the outer member includes a folding portion having a hole. With the projection inserted into the hole, the end portion of the inner member is held in the folding portion of the outer member. Subsequently, the edge of the outer member is clamped and swaged to form a hemming-coupled structure.

However, in the hemming-coupled structure described above, when the edge of the outer member is clamped and swaged, the relative position of the inner member and the outer member may become out of alignment. This hinders accurate positioning of the two members. This problem is not limited to a case in which members are joined to form a vehicle door frame and may generally occur in a case in which two members are joined to each other.

SUMMARY OF THE INVENTION

It is an object of the present invention to provide a method for manufacturing a swaged structure allowing two members to be positioned and joined to each other. It is also an object of the present invention to provide a swaged structure.

A swaged structure includes a first member and a second member. The first member includes an end portion. The end portion of the first member includes a plate part and a groove. The plate part includes an edge of the end portion of the first member. The second member includes an end portion. The end portion of the second member includes an edge and two side surfaces. The groove extends around the edge of the second member and the two side surfaces. The groove includes a side surface including an engaging portion. One of the side surfaces of the end portion of the second member includes an engaged portion. The engaging portion projects from the side surface of the groove or the engaged portion projects from the side surface of the end portion of the second member so that the engaging portion engages the engaged portion. A method for manufacturing the swaged structure includes preparing the first member including the plate part and the groove having a wide opening. The method further includes, after the preparing of the first member, inserting the end portion of the second member into the groove. The method further includes, after the inserting of the second member, pressing the plate part in a direction narrowing the opening of the groove to bring the engaging portion into contact with the engaged portion.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a swaged structure of a vehicle door frame will now be described.

Figure 1:
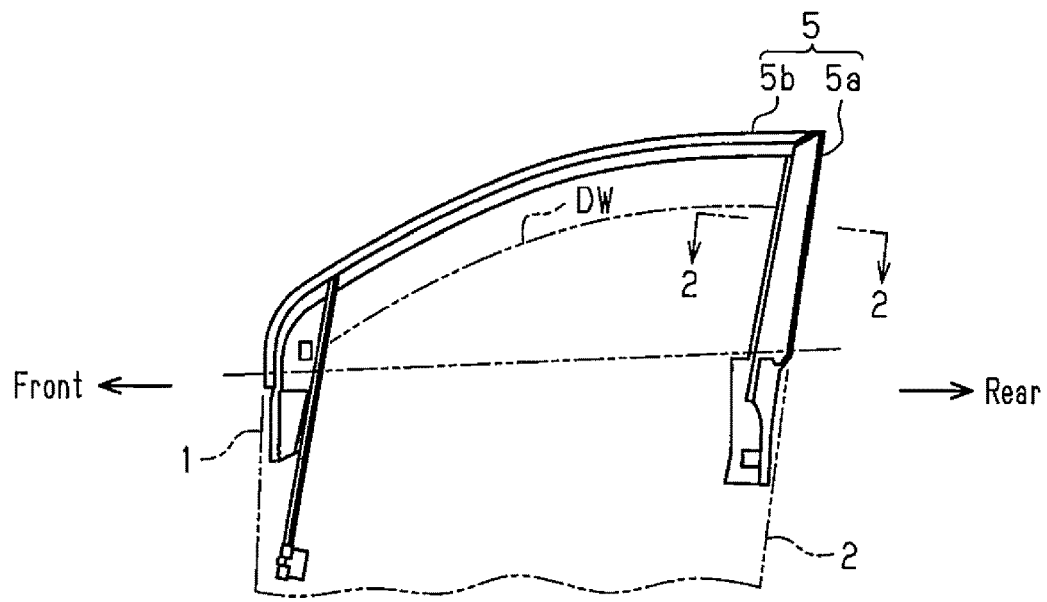
FIG. 1 is a side view of an upper structure of a vehicle door having one embodiment of a swaged structure taken from an outer side in a lateral direction of a vehicle (vehicle outer side)

As shown in FIG. 1, the side part of a vehicle body supports a vehicle door 1 that includes a door body 2 configured to be a lower part of the vehicle door 1. The door body 2 is a bag-shaped structural body formed by coupling a door outer panel, which is configured to be a door outer plate, and a door inner panel (not shown), which is configured to be a door inner plate, to each other. For example, a door window glass DW is arranged in the door body 2 and configured to eject from an upward opening.

The vehicle door 1 further includes a doorframe 5 attached to an upper end of the door body 2 and configured to be a window frame of the vehicle door 1 (i.e., frame of door window glass DW). The doorframe 5 includes a post 5a and an arcuate upper edge 5b. The post 5a is fixed to the door body 2 (e.g., door inner panel) at rear in a front-rear direction of the vehicle and extends in a height-wise direction of the vehicle. The upper edge 5b is fixed to the door body 2 at front in the front-rear direction of the vehicle and connected to an upper end of the post 5a. The doorframe 5 is downwardly open. The vehicle door 1 of the present embodiment is a front door and arranged so that the upper edge 5b and the post 5a of the doorframe 5 correspond to an A pillar and a B pillar of the vehicle body, respectively.

In the description hereinafter, the side of the doorframe 5 opposed toward the door window glass DW is referred to as the "inward side," and the opposite side is referred to as the "outward side." Additionally, the side in the lateral direction of the vehicle that is directed toward an inner side of the passenger compartment is referred to as the "vehicle inner side," and the side in the lateral direction of the vehicle that is directed toward an outer side of the passenger compartment is referred to as the "vehicle outer side."

Figure 2:
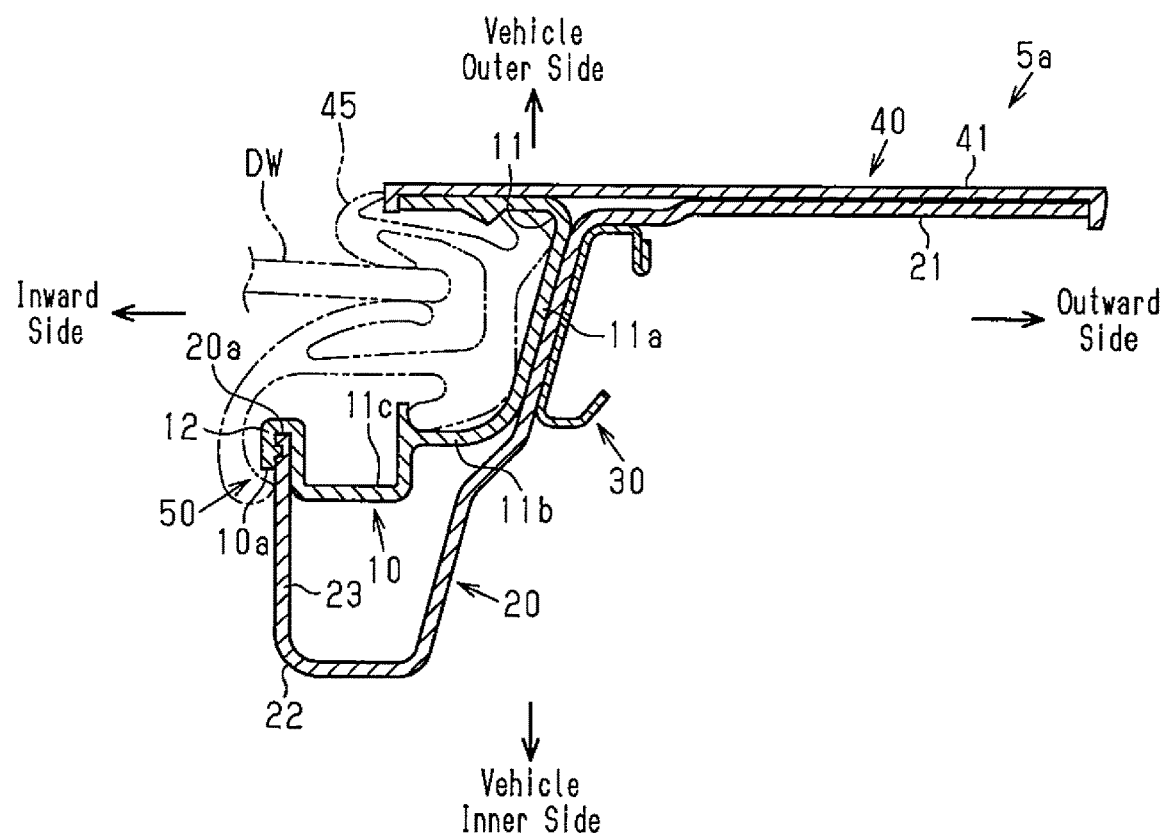
FIG. 2 is a cross-sectional view taken along line 2-2 in FIG. 1.

As shown in FIG. 2, the post 5a includes, for example, an outer member 10, an inner member 20, a sealant accommodation portion 30, and an ornamental member 40. The outer member 10 is one example of a first member formed by stamping a plate such as a steel plate of an aluminum alloy. The inner member 20 is one example of a second member formed by stamping a member similar to the first member. The sealant accommodation portion 30 has a C-shaped cross section that is open outward. The ornamental member 40 is located at the vehicle outer side and extends from the outward side to the inward side of the doorframe 5. The thickness of the inner member 20 is set to be greater than the thickness of the outer member 10. The end surface of the ornamental member 40 exposed to the vehicle outer side defines an ornamental surface 41 of the post 5a. The ornamental surface 41 has a width that gradually changes as the ornamental surface 41 extends in the height-wise direction of the vehicle to have a better design.

The outer member 10 includes a glass run housing 11 having a U-shaped cross section that is open inward. The glass run housing 11 includes a first wall 11a, a second wall 11b, and a third wall 11c. The first wall 11a extends from the vehicle outer side to the vehicle inner side. The second wall 11b is continuous with a vehicle-inner-side end of the first wall 11a and is bent inward. The third wall 11c is continuous with an inward end of the second wall 11b and extends from the outward side to the inward side.

The edge of the third wall 11c located at an end portion of the outer member 10 includes a folded portion 12 that is bent toward the vehicle outer side and folded toward the vehicle inner side. The folded portion 12 is orthogonally bent and formed by a plate part including an edge 10a of the end portion of the outer member 10. The folded portion 12 includes a first inner surface, a second inner surface opposed to the first inner surface, and a closed end inner surface connecting the first inner surface and the second inner surface. These surfaces define a receptacle 13 that is open at the vehicle inner side to allow communication between the space surrounded by the inner surfaces of the folded portion 12 and the outside of the folded portion 12.

The inner member 20 includes, an attachment portion 21 and a body 22 that are formed integrally with each other. The attachment portion 21 is located at the outward side of the glass run housing 11 and the vehicle inner side of the ornamental member 40 and extends from the outward side to the inward side along the ornamental member 40. The body 22 is continuous with an inward end of the attachment portion 21 and is bent toward the vehicle inner side and folded toward the vehicle outer side. The body 22 has a rectangular cross section and is opposed toward the receptacle 13 of the folded portion 12. The body 22 is configured to be the framework of the post 5a and inwardly includes an extension 23 linearly extending from the vehicle inner side toward the vehicle outer side in the lateral direction of the vehicle. The body 22 has a vehicle-outer-side portion inserted into the receptacle 13 and in contact with the outer member 10 from the outward side. More specifically, the extension 23 is located on an end of the inner member 20, and the extension 23 has an end serving as an insertion portion 24 inserted into the receptacle 13. With the insertion portion 24 inserted into the receptacle 13, the insertion portion 24 extends in the lateral direction of the vehicle and has outer surfaces opposed to the inner surfaces of the receptacle 13 and a distal surface opposed to the closed end inner surface of the receptacle 13 the insertion portion 24. More specifically, with the insertion portion 24 inserted into the receptacle 13, the end portion of the outer member 10 surrounds an edge 20a of the inner member 20 and the outer surfaces of the insertion portion 24. The insertion of the insertion portion 24 of the extension 23 into the receptacle 13 of the folded portion 12 forms a swaged structure 50 that couples the outer member 10 to the inner member 20.

Figure 3:
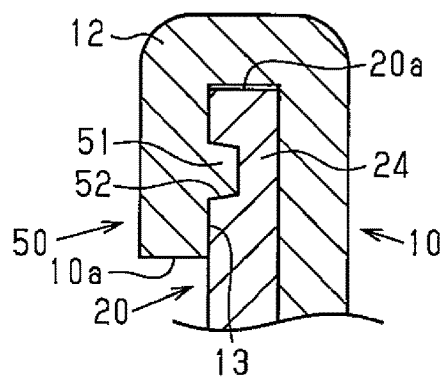
FIG. 3 is a cross-sectional view of the swaged structure shown in FIG. 2.

More specifically, as shown in FIG. 3, the inner surface of the receptacle 13 linearly extends in the lateral direction of the vehicle. Additionally, a projection 51 projects from the inner surface of the receptacle 13. The projection 51 engages a recess 52 formed in the outer surface of the insertion portion 24. The projection 51 is one example of an engaged portion. The recess 52 is one example of an engaging portion. The projection 51 is pressed against the recess 52 so that the projection 51 and the recess 52 are swaged. This forms the swaged structure 50.

In the swaged structure 50, a distal surface of the projection 51 is in planar contact with a bottom wall of the recess 52, and the projection 51 and the recess 52 are positioned in a projection direction of the projection 51. Additionally, a side surface of the projection 51 is in planar contact with a side wall of the recess 52. The projection 51 is in contact with the wall of the recess 52 at multiple positions, that is, opposite sides of the center of the projection 51, in a direction intersecting with the projection direction of the projection 51. This positions the insertion portion 24 in the insertion direction and increases the coupling strength of the swaged structure 50. There is a slight gap between the distal surface of the insertion portion 24 and the closed end inner surface of the receptacle 13.

The sealant accommodation portion 30 is in contact with a portion of the body 22 at the vehicle outer side from the outward side. The sealant accommodation portion 30 is joined to the body 22 together with the outer member 10, for example, by welding.

A glass run 45 is formed from, for example, a rubber material and has a U-shaped cross section. The glass run 45 is liquid-tightly attached to the glass run housing 11 along the full length in the longitudinal direction. The glass run 45 projects inward beyond at least the open end of the glass run housing 11 to limit entrance of water into the glass run housing 11. The glass run 45 is elastically contactable with both edges of the door window glass DW located at the vehicle outer side and the vehicle inner side and elastically holds the door window glass DW allowing for opening and closing of the door window glass DW.

A method for manufacturing the swaged structure of the present embodiment will now be described.

Figure 4A:
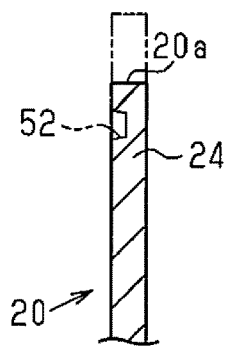
FIG. 4A is a diagram showing a first step in the process for manufacturing the swaged structure of FIG. 3.

As shown in FIG. 4A, when manufacturing the swaged structure 50 of the present embodiment, an end of the inner member 20 is cut to adjust the length of the insertion portion 24. At this time, in addition to cutting the end of the inner member 20, the recess 52 is simultaneously formed in the outer surface of the inner member 20. Thus, accurate positioning is performed on the relative position of the distal surface of the inner member 20 and the recess 52.

Figure 4B:
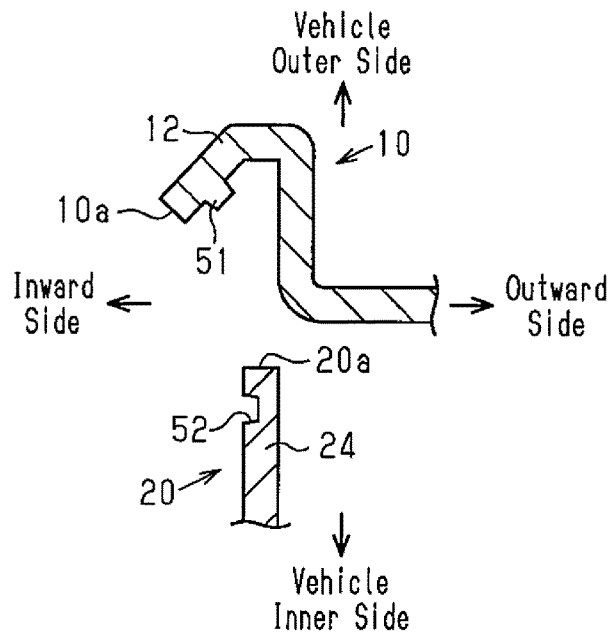
FIG. 4B is a diagram showing a second step in the process for manufacturing the swaged structure of FIG. 3.

As shown in FIG. 4B, when the folded portion 12 of the third wall 11c of the outer member 10 is bent at an obtuse angle, the insertion portion 24 of the inner member 20 is opposed to the folded portion 12 of the outer member 10 in the lateral direction of the vehicle. The projection 51 is formed on the side surface of the receptacle 13 of the outer member 10. The recess 52 is formed in the side surface of the insertion portion 24 located at the end of the inner member 20. At this time, in the folded portion 12 of the outer member 10, the opening of the receptacle 13 is wide enough to limit interference of the projection 51 with the wall of the recess 52.

Figure 4C:
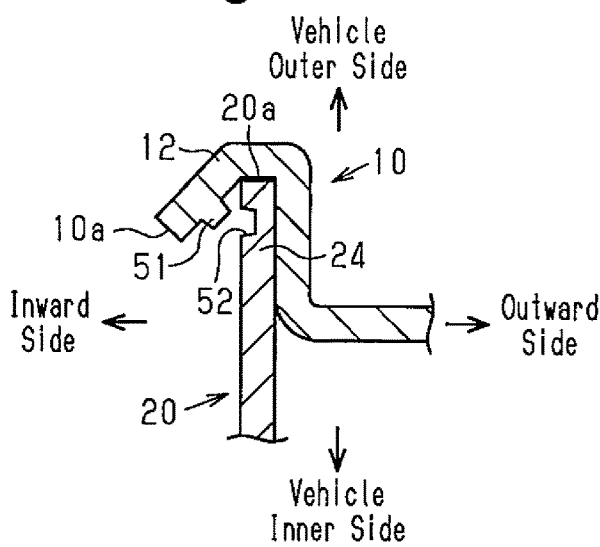
FIG. 4C is a diagram showing a third step in the process for manufacturing the swaged structure of FIG. 3.

As shown in FIG. 4C, the inner member 20 is moved toward the outer member 10 in the lateral direction of the vehicle. At this time, an outer part of the body 22 of the inner member 20 comes into contact with the outer member 10 from the inward side. As the outer part of the body 22 of the inner member 20 is guided in the lateral direction of the vehicle, the distal surface of the insertion portion 24 comes into contact with the closed end inner surface of the folded portion 12 of the outer member 10.

Figure 4D:
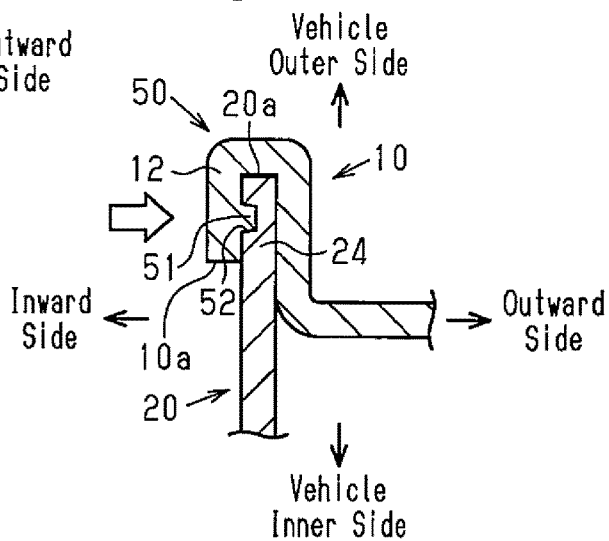
FIG. 4D is a diagram showing a fourth step in the process for manufacturing the swaged structure of FIG. 3.

As shown in FIG. 4D, the folded portion 12 of the outer member 10 is folded to move toward the outer surface of the inner member 20. The projection 51 of the folded portion 12 of the outer member 10 is pressed against the recess 52 in the outer surface of the inner member 20 to be swaged. This forms the swaged structure 50 coupling the projection 51 of the outer member 10 to the recess 52 of the inner member 20.

At this time, the cross section of the projection 51 of the outer member 10 is set to be slightly larger than the opening of the recess 52 of the inner member 20. In one example, the projection 51 has a larger diameter than the recess 52. The projection 51 may have a longer circumference or a longer side than the recess 52. Thus, when the side surface of the projection 51 of the outer member 10 is pressed against the side wall of the recess 52 of the inner member 20, the projection 51 of the outer member 10 is press-fitted into the recess 52 of the inner member 20. The side surface of the projection 51 is in contact with the side wall of the recess 52 at multiple positions, that is, opposite sides of the center of the projection 51 in a direction intersecting with the projection direction of the projection 51. The distal end of the projection 51 is in contact with the bottom wall of the recess 52 in the projection direction of the projection 51.

As described above, when the projection 51 of the outer member 10 is engaged with the recess 52 of the inner member 20, and the insertion portion 24 is positioned in the insertion direction, the projection 51 of the outer member 10 and the recess 52 of the inner member 20 are swaged. This forms the swaged structure 50.

In particular, in the present embodiment, as described above, at the same time as the end of the inner member 20 is cut, the recess 52 is formed in the outer surface of the inner member 20. Thus, accurate positioning is performed on the relative position of the distal surface of the inner member 20 and the recess 52. This reduces the size of a gap between the distal surface of the insertion portion 24 of the inner member 20 and the closed end inner surface of the folded portion 12 of the outer member 10. Accordingly, the swaged structure 50 is reduced in size in the lateral direction of the vehicle, which may slim the doorframe 5 in the lateral direction of the vehicle.

As described above, the present embodiment has the advantages described below.

(1) In the present embodiment, after the insertion portion 24 of the inner member 20 is inserted into the receptacle 13 of the folded portion 12 of the outer member 10, the projection 51 formed on the inner surface of the receptacle 13 is pressed against the recess 52 formed in an outer surface intersecting with the insertion direction of the insertion portion 24 so that the projection 51 and the recess 52 are swaged. Thus, while the insertion portion 24 and the receptacle 13 are positioned in the insertion direction of the insertion portion 24, the swaged structure 50 is formed.

(2) In the present embodiment, the cross section of the projection 51 orthogonal to the projection direction is larger than the opening of the recess 52. Thus, while the insertion portion 24 and the receptacle 13 are positioned in the insertion direction of the insertion portion 24 with higher accuracy, the swaged structure 50 is formed.

(3) In the present embodiment, when the folded portion 12 is open widely, the insertion portion 24 is inserted into the receptacle 13. Then, the folded portion 12 is folded so that the projection 51 is pressed against the recess 52 to be swaged. Thus, even when there is a design error on the relative position of the insertion portion 24 and the receptacle 13, the insertion portion 24 is accurately inserted into the receptacle 13 to form the swaged structure 50.

(4) In the present embodiment, the distal surface of the insertion portion 24 and the recess 52 are simultaneously formed. This increases the accuracy of relative positioning of each part. Thus, when the projection 51 is engaged with the recess 52 and the insertion portion 24 is inserted into the receptacle 13, the distal surface of the insertion portion 24 may be located close to the receptacle 13 with high accuracy. This limits enlargement of the swaged structure 50 in the lateral direction of the vehicle, which may slim the doorframe 5 in the lateral direction of the vehicle.

(5) In the present embodiment, the outer member 10 includes a side wall extending from the outer side to the inner side in the lateral direction of the vehicle. The end of the side wall includes the folded portion 12 that is bent toward the outer side in the lateral direction of the vehicle and folded toward the inner side in the lateral direction of the vehicle. The inner member 20 includes the body 22 extending from the outer side to the inner side in the lateral direction of the vehicle. The extension 23 is folded toward the outer side in the lateral direction of the vehicle and linearly extends from an end of the body 22 in the lateral direction. The distal end of the extension 23 serves as the insertion portion 24 inserted into the opening of the folded portion 12 in the lateral direction of the vehicle. When the projection 51 and the recess 52 are positioned, the swaged structure 50 is formed. This increases the accuracy for coupling the vehicle door frame.

(6) In the swaged structure 50 of the present embodiment, when the projection 51 is in planar contact with the recess 52, the projection 51 and the recess 52 are swaged. Thus, while the insertion portion 24 and the receptacle 13 are positioned in the insertion direction of the insertion portion 24, the swaged structure 50 is formed.

The embodiments described above may be modified as described below.

Figure 5A:
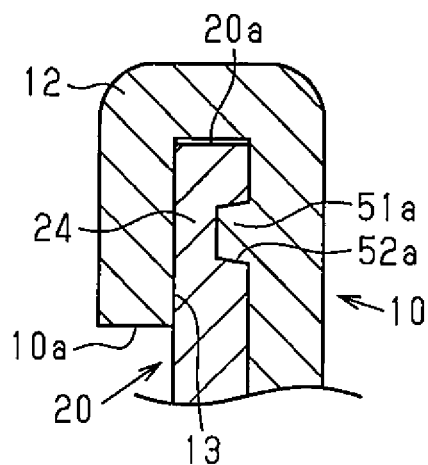
FIG. 5A is a cross-sectional view showing a first modified mode of a swaged structure.

In the example shown in FIG. 5A, a projection 51a is formed on the inner surface of the basal part of the folded portion 12 of the outer member 10, and a recess 52a is formed in the outer surface of the insertion portion 24 of the inner member 20 to engage the projection 51a. In the example shown in FIG. 5B, a recess 52b is formed on the inner surface of the basal part of the folded portion 12 of the outer member 10, and a projection 51b is formed on the outer surface of the insertion portion 24 of the inner member 20 to engage the recess 52b. In the examples shown in FIG. 5C, a recess 52c is formed in the inner surface of the distal part of the folded portion 12 of the outer member 10, and a projection 51c is formed on the outer surface of the insertion portion 24 of the inner member 20 to engage with the recess 52c.

Figure 5B:
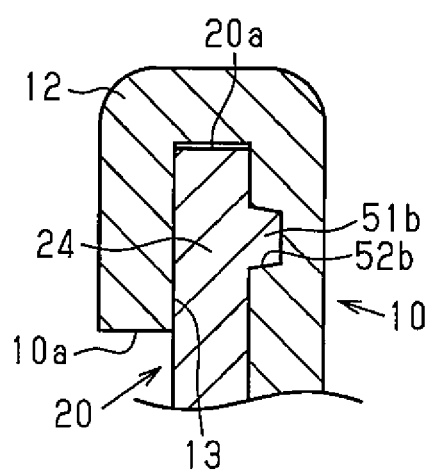
FIG. 5B is a cross-sectional view showing a second modified mode of a swaged structure.
Figure 5C:
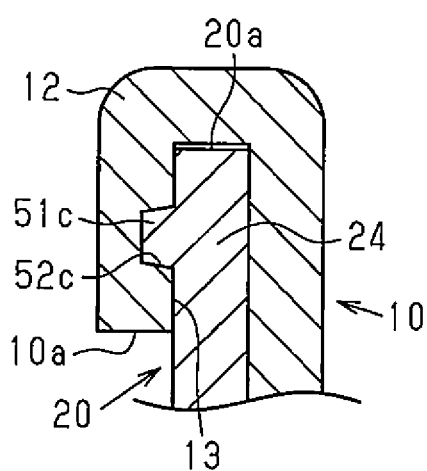
FIG. 5C is a cross-sectional view showing a third modified mode of a swaged structure.
Figure 6A:
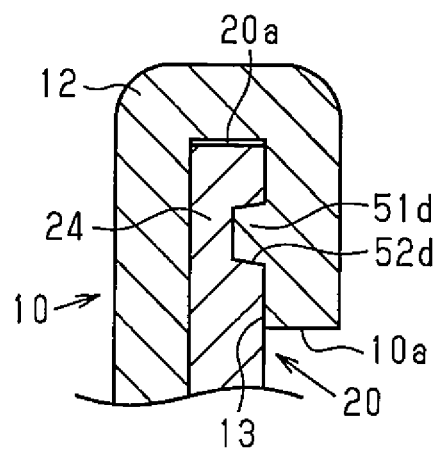
FIG. 6A is a cross-sectional view showing a fourth modified mode of a swaged structure.
Figure 6B:
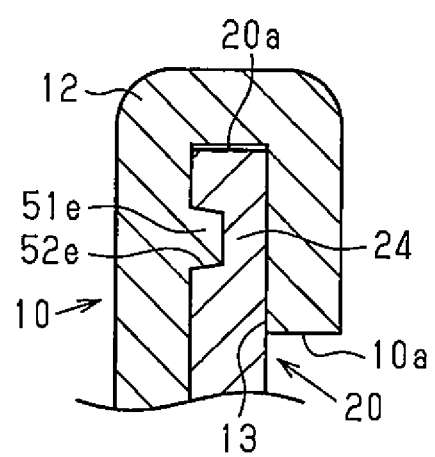
FIG. 6B is a cross-sectional view showing a fifth modified mode of a swaged structure.
Figure 6C:
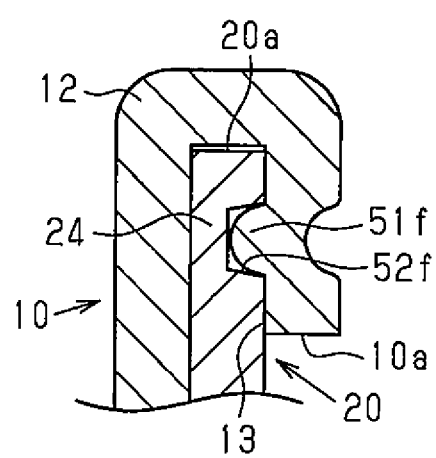
FIG. 6C is a cross-sectional view showing a sixth modified mode of a swaged structure.

Further, the folded portion 12 of the outer member 10 may be folded in a direction opposite to that shown in the examples shown in FIGS. 5A to 5C. In this case, in the example shown in FIG. 6A, a projection 51d is formed on the inner surface of the distal part of the folded portion 12 of the outer member 10, and a recess 52d is formed in the outer surface of the insertion portion 24 of the inner member 20 to engage the projection 51d. In the example shown in FIG. 6B, a projection 51e is formed on the inner surface of the distal part of the folded portion 12 of the outer member 10, and a recess 52e is formed in the outer surface of the insertion portion 24 of the inner member 20 to engage the projection 51e. In the example shown in FIG. 6C, a recess 52f is formed in the outer surface of the insertion portion 24 of the inner member 20, and the distal part of the folded portion 12 of the outer member 10 is pressed and deformed from outside. As a result, a projection 51f is formed on the inner surface of the distal part of the folded portion 12 of the outer member 10 to engage the recess 52f.

Figure 6D:
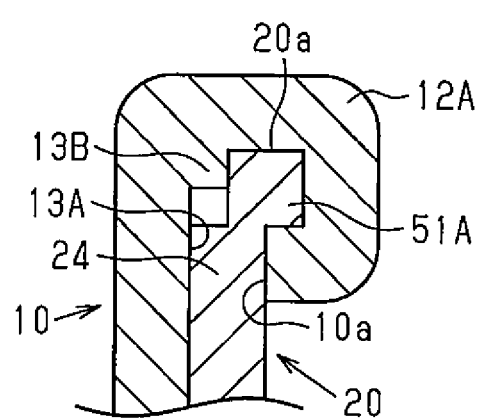
FIG. 6D is a cross-sectional view showing a seventh modified mode of a swaged structure.

The distal end of the insertion portion 24 of the inner member 20 may be bent at a right angle. In the example shown in FIG. 6D, the outer member 10 includes a folded portion 12A that is bent multiple times, and the outer member 10 has a receptacle 13A that is bent and L-shaped. A projection 51A is formed on the distal end of the insertion portion 24 of the inner member 20. As the insertion portion 24 of the inner member 20 is elastically deformed against the receptacle 13A of the outer member 10, the projection 51A is press-fitted into the receptacle 13A of the outer member 10 to form a swaged structure. A step 13B is formed in a corner of the receptacle 13A of the outer member 10. The step 13B restricts separation of the insertion portion 24 of the inner member 20 from the receptacle 13A of the outer member 10. Also, when the outer surface of the folded portion 12A of the outer member 10 is pressed, the pressing force is transmitted via the step 13B to the insertion portion 24 of the inner member 20. This forms the swaged structure 50 coupling the outer member 10 to the inner member 20.

In the above embodiment, the step of cutting the end of the inner member 20 may be performed separately from the step of forming the recess 52 in the outer surface of the inner member 20.

In the above embodiment, the opening of the recess 52 of the inner member 20 may be set to the same size as the cross section of the projection 51 of the outer member 10. The recess 52 of the inner member 20 may engage the projection 51 of the outer member 10 without elastic deformation.

In the above embodiment, the material of the inner member 20 and the outer member 10 does not necessarily have to be an aluminum alloy. The material of at least one of the inner member 20 and the outer member 10 may be another material, for example, stainless steel.

In the above embodiment, when the outer surface of the insertion portion 24 of the inner member 20 is in point contact or linear contact with the inner surface of the receptacle 13 of the outer member 10, the swaged structure 50 may be formed.

In the above embodiment, with the distal surface of the projection 51 of the outer member 10 separated from the bottom wall of the recess 52 of the inner member 20, when the side surface of the projection 51 is in planar contact with the side wall of the recess 52, the swaged structure 50 may be formed.

In the above embodiment, the recess 52 may be formed in the inner member 20, and the projection 51 may be formed on the outer member 10 to engage the recess 52.

In the above embodiment, the outer member 10 or the inner member 20 may be a plate obtained through roll forming. In this case, the outer member 10 or the inner member 20 may have a fixed cross section in the longitudinal direction.

In the above embodiment, the swaged structure 50 does not necessarily have to be provided in the entire post 5a in the height-wise direction of the vehicle and may be partially provided in the post 5a in the height-wise direction of the vehicle.

The present invention may be applied to, for example, a door frame of a rear door. However, application of the present disclosure is not limited to a vehicle door frame. The present disclosure may be applied to any structure coupling two members through swaging using a recess and a projection.

The invention claimed is:

1. A method for manufacturing a swaged structure, wherein the swaged structure includes a first member and a second member, the first member includes an end portion having a folded shape, the end portion of the first member includes a plate part and a groove, the groove includes a first inner surface and a second inner surface opposed to the first inner surface, the second inner surface is located at a position further from an edge of the first member than the first inner surface, the plate part includes the edge of the end portion of the first member and the first inner surface, the second member includes an end portion, the end portion of the second member includes an edge, a first outer surface configured to be opposed to the first inner surface, and a second outer surface configured to be opposed to the second inner surface, the groove extends around the edge, the first outer surface, and the second outer surface of the second member, the groove includes an engaging portion projecting from the first inner surface, the second inner surface is a flat surface, the first outer surface of the end portion of the second member includes an engaged portion that is recessed to engage with the engaging portion, and the second outer surface of the end portion of the second member is a flat surface, the method comprising:

preparing the first member including the plate part and the groove, the plate part defining a width of an opening of the groove;

after the preparing of the first member, inserting the end portion of the second member into the groove so that the second inner surface of the groove of the first member contacts the second outer surface of the second member; and after the inserting of the second member, pressing the plate part in a direction narrowing the width of the opening of the groove to move the engaging portion of the first member toward the engaged portion of the second member thereby press-fitting the engaging portion with the engaged portion.

2. The method according to claim 1, wherein
the engaging portion has a cross section that is orthogonal to a projection direction of the engaging portion and is, prior to the press-fitting of the engaging portion with the engaged portion, larger than a cross section of an opening of the engaged portion, the cross section of the engaging portion being, after the press-fitting of the engaging portion with the engaged portion, co-planar with the cross section of the opening of the engaged portion.

3. The method according to claim 1, further comprising simultaneously forming a distal surface of the end portion of the second member and the engaged portion before the inserting of the second member.

4. The method according to claim 1, wherein
the first member and the second member form a vehicle door frame, the first member includes a side wall extending from an outer side to an inner side in a lateral direction of a vehicle, the side wall includes a distal part including the end portion of the first member and having the groove bent toward the outer side in the lateral direction of the vehicle and folded toward the inner side in the lateral direction of the vehicle, the groove includes the engaging portion, the opening of the groove opens toward the inner side in the lateral direction, the second member includes a body extending from the outer side to the inner side in the lateral direction of the vehicle, the body includes a distal end including an extension, the extension is folded toward the outer side in the lateral direction of the vehicle and linearly extends in the lateral direction of the vehicle, a distal end portion of the extension includes the engaged portion, and the extension includes an end inserted into an opening of the end portion of the first member in the lateral direction of the vehicle.

\* \* \* \* \*